US 6,650,427 B2

(12) United States Patent
Brooks et al.

(10) Patent No.: US 6,650,427 B2
(45) Date of Patent: Nov. 18, 2003

(54) SELF VALIDATING PRINTER WITH TICKET VOIDING FEATURES

(75) Inventors: Donald E. Brooks, Ithaca, NY (US); Bart C. Shuldman, Westport, CT (US); Mark B. Goebel, Chicopee, MA (US)

(73) Assignee: TransAct Technologies Incorporated, Wallingford, CT (US)

( * ) Notice: Subject to any disclaimer, the term of this patent is extended or adjusted under 35 U.S.C. 154(b) by 0 days.

(21) Appl. No.: 10/017,897

(22) Filed: Oct. 22, 2001

(65) Prior Publication Data

US 2002/0181007 A1 Dec. 5, 2002

Related U.S. Application Data

(63) Continuation-in-part of application No. 09/872,782, filed on Jun. 1, 2001.

(51) Int. Cl.[7] .............................................. G06F 15/00
(52) U.S. Cl. .................. 358/1.12; 358/1.14; 358/1.15; 358/1.18; 235/449; 235/475; 235/375
(58) Field of Search .......................... 358/1.12, 1.14, 358/1.15, 1.18; 235/449, 475, 375, 456, 385, 480; 463/16, 17, 25, 29; 273/269; 380/51

(56) References Cited

U.S. PATENT DOCUMENTS

| 4,373,726 | A | | 2/1983 | Churchill et al. ............. 463/19 |
|---|---|---|---|---|
| 4,626,672 | A | | 12/1986 | Sapitowicz et al. ......... 235/480 |
| 4,704,518 | A | | 11/1987 | Brunn et al. ................. 235/480 |
| 4,788,419 | A | | 11/1988 | Walters et al. ............... 235/381 |
| 4,858,123 | A | | 8/1989 | Alexoff et al. ................ 385/1.1 |
| 4,859,839 | A | | 8/1989 | Tetelman et al. ........... 235/385 |
| 5,091,634 | A | * | 2/1992 | Finch et al. ................. 235/375 |
| 5,119,295 | A | | 6/1992 | Kapur ........................... 463/41 |
| 5,173,596 | A | | 12/1992 | Kapinos et al. ............. 235/475 |
| 5,223,698 | A | | 6/1993 | Kapur ........................ 235/475 |
| 5,483,048 | A | | 1/1996 | Kobayashi .................. 235/380 |
| 5,484,215 | A | | 1/1996 | Fillod et al. ........... 400/120.18 |
| 5,580,311 | A | | 12/1996 | Haste, III ..................... 463/17 |
| 5,595,538 | A | | 1/1997 | Haste, III ..................... 463/17 |
| 5,598,477 | A | | 1/1997 | Berson ......................... 380/51 |
| 5,625,562 | A | | 4/1997 | Veeneman et al. .......... 700/235 |
| 5,682,819 | A | | 11/1997 | Beaty .......................... 101/483 |
| 5,684,285 | A | * | 11/1997 | Faes et al. ................... 235/449 |
| 6,012,832 | A | * | 1/2000 | Saunders et al. ............ 235/380 |
| 6,048,269 | A | | 4/2000 | Burns et al. ................... 463/25 |
| 6,088,119 | A | | 7/2000 | Manchala et al. ......... 358/1.14 |
| 6,110,044 | A | | 8/2000 | Stern ............................ 463/29 |
| 6,280,326 | B1 | | 8/2001 | Saunders ..................... 463/25 |
| 2001/0027126 | A1 | | 10/2001 | Saunders ..................... 463/25 |
| 2001/0034266 | A1 | | 10/2001 | Saunders ..................... 463/25 |

FOREIGN PATENT DOCUMENTS

WO    WO 94/16781    8/1994

* cited by examiner

Primary Examiner—Edward Coles
Assistant Examiner—Twyler Lamb
(74) Attorney, Agent, or Firm—Barry R. Lipsitz; Douglas M. McAllister (57) ABSTRACT

Methods and apparatus are provided for printing and validating a document, such as a ticket or voucher printed on a substrate such as paper. After the document is printed, at least a portion thereof is read to test a validity criteria. The document is dispensed to a recipient if the validity criteria is met. If the validity criteria is not met after the first read, the document can optionally be re-read. If the validity criteria is never met, the document is voided. The voided document can be held or dispensed to the recipient and a replacement document can be printed, read for validation purposes and dispensed. If the replacement document is not valid, it is voided. A voided replacement document can be either held or dispensed. Assistance from a machine attendant is required only in the event that a predetermined number of invalid print/read/validate cycles occur.

23 Claims, 5 Drawing Sheets

SELF VALIDATING PRINTER WITH TICKET VOIDING FEATURES

This application is a continuation-in-part of copending U.S. patent application Ser. No. 09/872,782 filed on Jun. 1, 2001.

BACKGROUND OF THE INVENTION

The present invention relates generally to printers and paper transport mechanisms, and more particularly to a ticket printer with reading, validating, paper transport and ticket voiding features. Such printers are particularly well suited for use in gaming machines, vending machines, point-of-sale (POS) terminals, transportation and entertainment ticket machines, and the like.

Ticket or voucher printers are useful in a variety of applications. One such application is to print coded tickets or vouchers used in lottery terminals, slot machines and other self-service wagering apparatus. While various printer technologies are well known, such as inkjet and laser printers, thermal printers are currently preferred in such applications for their speed and reliability. Accordingly, the present invention will be described in connection with a thermal printing implementation, although it should be understood that this is by way of example only, and virtually any other type of printer may be used in implementing the invention.

Various printer systems have been proposed for use in self-service terminals, such as for cashless gaming systems used, e.g., at casinos and racetracks. In such systems, a ticket (alternatively referred to herein as a "voucher") is provided to the gaming patron for use instead of, e.g., tokens, cash, debit cards and credit cards. It is well known to use tokens in gambling casinos. For example, in a typical gaming machine environment, a player inserts coins or tokens and plays the game. When the player is finished and has a winning cash amount, a cash-out button is pressed and the appropriate number of coins or tokens is dispensed in a cash out bin. It is awkward, however, to deal with such tokens and to cash them in before leaving the casino.

The use of credit and debit cards has been proposed as an alternative to tokens. However, there has existed a strong public policy against allowing persons to be able to access their full credit limit for gambling purposes.

Other approaches have used magnetically striped cards in which a cash value is stored. Such cards (sometimes also referred to as vouchers or tickets) have been used in gaming systems as well as in transportation systems, particularly various subway systems. Once the cash value of the card is used up it can be refilled, or the card can be discarded and a new one purchased.

U.S. Pat. No. 6,012,832 to Saunders et al. issued on Jan. 11, 2000 for "Cashless Peripheral Device For A Gaming System" discloses, as part of a gaming system, a ticket printer that prints a coded value, such as a bar code, on a ticket in response to a cash-out signal from the gaming system. The ticket is then passed to a reader which reads the coded value printed on the ticket. If the printed value corresponds to the value which should have been printed, a ticket-out transport delivers the printed ticket to the player cashing out from the gaming system. However, if the printed value does not correspond to the correct value, the ticket is held without dispensing to the player. Instead, the ticket is held in place by the ticket-out transport, a message is displayed that a malfunction has occurred, and an alarm message is delivered to summon an attendant to immediately visit the machine. The invalid ticket is firmly held to prevent the player from receiving it.

The system described in the '832 patent requires attention by an attendant any time the coded value read from the just printed ticket does not match the value that was supposed to be printed. There is no way to determine if the reader simply incorrectly read the coded value, or if the coded value is really wrong. If the coded value is wrong, there is no disclosure of how to handle the invalid ticket, other than simply holding it. There is no way for a patron to receive the ticket once the reader determines (correctly or incorrectly) that the coded value is wrong. Absent direct attention from an attendant (who has to open the machine, diagnose the problem, and deal with a customer who may be aggravated and become upset that valuable time is being wasted), there is no way to recover from a malfunction (which may be something as simple as an incorrect reading of a valid coded value). Still further, the gaming machine will be out of commission while the attendant is being summoned and is fixing the machine. This will cause the machine owner to lose revenue, which can add up to a significant amount over time, particularly in facilities that operate a large number of such gaming machines.

It would be advantageous to provide a better way for validating tickets, vouchers or the like after printing without the need to shut down the terminal using the printer immediately after an initial invalidity determination. It would be further advantageous to provide a printer for gaming machines, vending machines and other terminals that print tickets, vouchers or the like, that has the ability to overcome apparent printing errors without summoning an attendant in the first instance, e.g., if the initial invalidity determination is wrong. It would be still further advantageous to provide a method for printing and validating, as well as associated printer apparatus, that enables tickets, vouchers or the like which are found to be invalid to be immediately voided.

The present invention provides a printer and associated methods for printing, validating, voiding, and processing substrates of value, all having the above and other advantages.

SUMMARY OF THE INVENTION

In accordance with the present invention, methods are provided for printing and validating a document, such as a ticket or voucher printed on a substrate such as paper. After the document is printed, at least a portion thereof is read to test a validity criteria. The document is dispensed to a recipient if the validity criteria is met. If the validity criteria is not met, the document is voided.

The reading step can be repeated at least once before the document is voided. In this manner, the document for which the reading step has been repeated can be dispensed to the recipient as a valid document if the validity criteria is met after a repeated reading step. On the other hand, if the document is not found to be valid on the final re-read, it is voided. In a preferred embodiment, the portion of the document which is read to test the validity criteria comprises a bi-directional code, such as a bar code. The re-reading of the bi-directional code during the repeating step can therefore be performed in an opposite direction than the initial reading of the code.

The voiding step can, for example, void the document by printing voiding indicia thereon. The voiding indicia can either partially or completely obliterate a bar code, for example, or can print the word VOID across the document in a manner which will prevent any further use thereof.

After voiding, the voided document can be dispensed to the recipient. Alternatively, the voided document can be held (e.g., in the printer or the printer transport mechanism) without dispensing it.

The document can comprise, e.g., a wagering ticket or voucher, a ticket for admission to an event, or a ticket for use in a pubic transportation system.

Printer apparatus is also disclosed in accordance with the present invention. The printer has document verification, dispensing and voiding features, and includes various components, including a transport, a print module and a read module. The print module is used to print indicia on a substrate (e.g., paper) carried by the transport. The read module reads at least a portion of the indicia to test a validity criteria. The transport dispenses the printed substrate to a recipient if the validity criteria is met, and transports the printed substrate to be voided if the validity criteria is not met.

In an illustrated embodiment of the invention, the transport transports the printed substrate back to the print module, if necessary, to be voided. For example, the transport can be a bi-directional transport, which reverses direction to transport the substrate back to the print module. The print module then voids the substrate by printing voiding indicia thereon.

The read module can be implemented to re-read the substrate prior to voiding same. The transport can then dispense the re-read substrate to the recipient as a valid substrate if the validity criteria is met upon the re-reading.

In the illustrated embodiment, the print module comprises a thermal print head and the substrate comprises thermal print paper. It should be appreciated, however, that the invention is not limited to any particular type of printer or substrate. Moreover, without limitation, the printed substrate can be a wagering ticket or voucher and the read module can comprise a bar code reader.

The printer apparatus can also include a controller coupled to control the printing, reading and transport functions. The controller can reside, for example, on a printed circuit board which is packaged with the other printer components. The controller can actuate the transport to dispense the voided substrate to said recipient. Alternatively, the controller can cause the transport to hold the voided substrate without dispensing it.

In one embodiment, the controller communicates results of the validity criteria test to a remote processor. The remote processor can comprise, for example, a processor provided in a terminal or the like (e.g., self-service wagering terminal) that contains the printer. Alternatively, the remote processor can comprise a host computer that is coupled to the printer apparatus. Such coupling can be provided either directly between the controller and the remote processor, or via the apparatus (e.g., wagering terminal or the like) of which the printer apparatus is a component. Coupling to a host computer can be accomplished in a conventional manner, such as through a private communications network or the Internet.

After communicating the validity results to the remote processor, the controller will wait for instructions (based on the validity results) from the remote processor. The controller will then actuate at least one of the print module, read module and transport in response to the received instructions. The instructions may, for example, instruct the controller to re-read the indicia before voiding the substrate, and to dispense the substrate to the recipient as a valid substrate if the validity criteria are met after re-reading. The instructions may also instruct the controller to dispense a void substrate after voiding. Alternatively, the instructions may instruct the controller to hold a voided substrate without dispensing it. The controller will then actuate the necessary printer apparatus components to comply with the instructions.

DETAILED DESCRIPTION OF THE INVENTION

The present invention relates to the printing and validating of tickets, vouchers and the like having a cash or cash-equivalent value for dispensing to customers. The invention can be implemented in any suitable printer technology, such as thermal, inkjet, laser or the like. In the following description, the invention is described in connection with a thermal printer, such as those manufactured by the assignee TransAct Technologies Incorporated of Wallingford, Conn., U.S.A. for use in gaming machines, vending machines, self-service ticket terminals, and the like.

Figure 1:
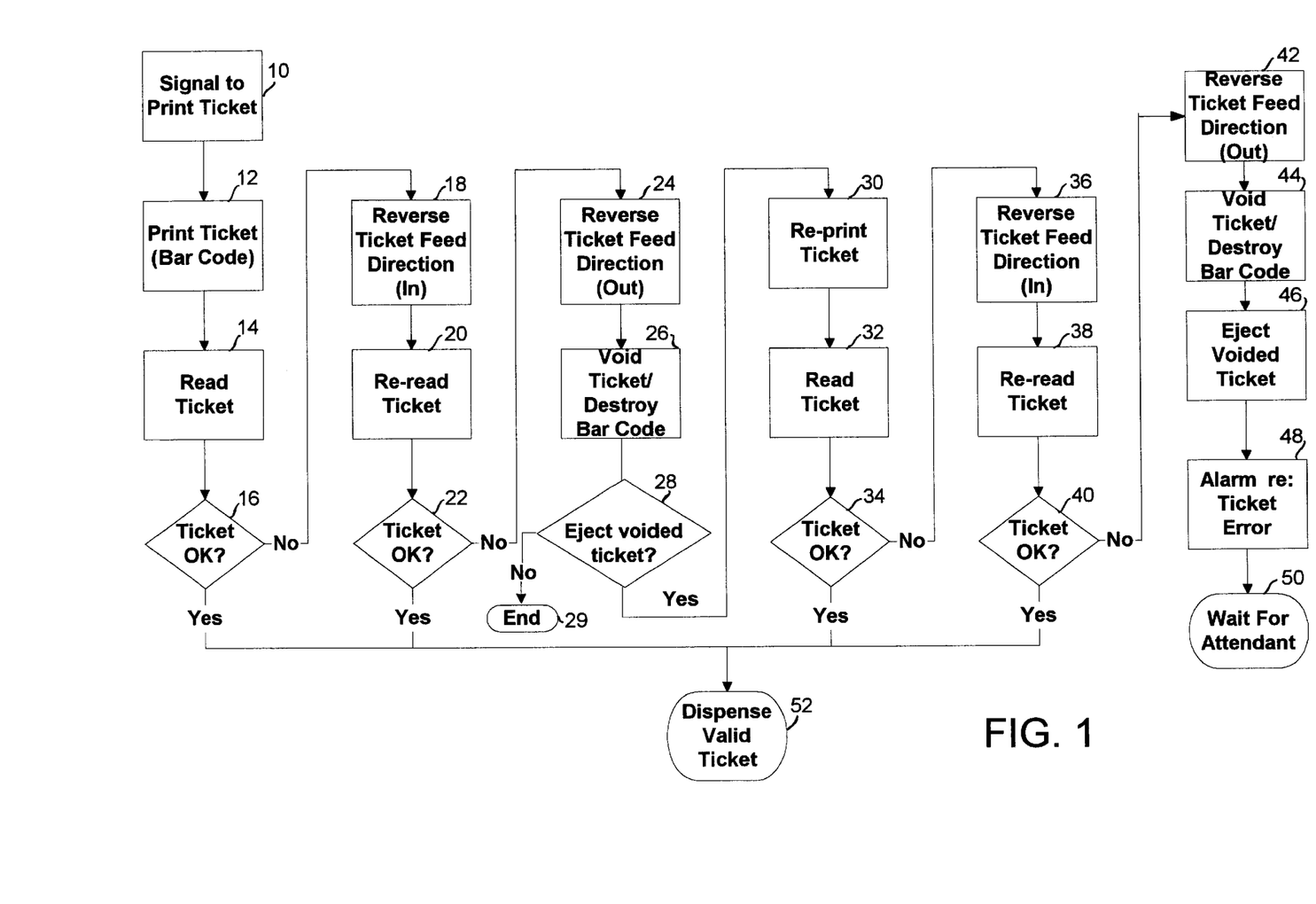
FIG. 1 is a flow chart illustrating a document printing, validating and dispensing process in accordance with the present invention.

FIG. 1 is a flowchart illustrating the operation of a printer or printing system (e.g., for a ticket issuing terminal or the like) in accordance with the invention. It is noted that the term "ticket" as used herein is intended to include any type of ticket, voucher or similar item (e.g., document) of value printed on a substrate. A printer receives a signal to print a ticket, as indicated at box 10. The ticket is printed with indicia such as text and a printed code, as shown at box 12. The printed code can be, for example, a bar code or other digital code known in the art. Preferably, a bi-directional code will be used, such as a bar code that can be read by scanning in either longitudinal direction.

At box 14, at least a portion of the printed ticket is read (e.g., a bar coded portion read by a bar code scanner) to test a validity criteria. The validity criteria can simply require that a printed bar code have a value (e.g., a cash value or other numerical or coded value) that matches a value or a number that the printer was instructed to print. If the validity criteria is found to be met at box 16 ("Ticket OK"), the printed ticket is dispensed to a recipient (box 52), such as a player at a gaming terminal or a customer at a self-service ticketing terminal.

In the event that the validity criteria is not met at box 16, control flows to box 18 where the substrate on which the ticket is printed is caused to be fed in a reverse direction, toward the input side of the terminal. This can be accomplished by using a substrate transport (e.g., paper transport) mechanism that is reversible, such as a transport driven by a D.C. stepper motor and electronic controller as well known in the art. While the ticket is being transported in the reverse direction, it is again read as indicated at box 20 (preferably by the same reader used to read the ticket at box 14), but this time in a reverse direction. The use of a bi-directional code on the ticket as mentioned above is, of course, necessary to allow reading in the reverse direction. If a code which is not bi-directional is used, the portion of the ticket to be re-read will have to be transported to a point before the reader so that the reader can re-read the ticket in the same direction in which it was initially read.

If the validity criteria is found to be met when the ticket is re-read (box 22), the ticket is dispensed to the recipient as indicated at box 52. In the event that the re-reading of the ticket was performed in the reverse direction (i.e., in a feed direction toward the input of the printer), the transport will have to be reversed again in order to dispense the ticket from the output side of the printer.

If the validity criteria is not found to be met at box 22, the ticket feed direction is reversed (toward the output side of the terminal) as indicated at box 24, and the ticket is voided as indicated at box 26. The voiding can be performed, for example, by destroying a bar code on the ticket by overprinting, perforation, or the like. Where an over-printing technique is used, the same print head used to print the ticket at box 12 can be used. In an implementation where the print head is stationary and the substrate is moved, the ticket will be reversed far enough back through the printer, so that the printer can re-print over the bar code. Alternatively, a separate printer downstream from the first printer could be provided, or a perforator module could be provided to perforate the ticket to void it. These alternative options are less desirable, however, as they will add cost to the printer system.

At box 28, a determination is made as to whether the voided ticket is to be ejected (i.e., dispensed) to the recipient. This determination can be made, for example, by software or firmware resident in the printer controller. Alternatively, the printer controller can communicate with a remote processor (e.g., in the terminal of which the printer is a component, or at a host computer), which remote processor will instruct the printer controller as to how to handle a voided ticket. In the preferred embodiment, the same slot is used to dispense a valid ticket or eject a voided ticket. However, a separate slot could be provided for the ejection of voided tickets. In the event that the voided ticket is not ejected, it is held in the printer (or in the terminal or other device of which the printer is a component), and the routine ends at box 29.

In an implementation where a voided ticket is ejected (or concurrent with the ejection process), a new ticket can be immediately printed as indicated at box 30. It is also possible to print a replacement ticket in embodiments where the voided ticket is held; although this may require that the voided ticket first be diverted to a holding bin to clear the path for the replacement ticket through the printer. Preferably, the customer is notified that the replacement ticket is on its way, either by an electronic display on the terminal, an audible signal, or a printed message on the voided ticket. Such a printed message can be produced at the same time the printer is voiding the ticket.

The replacement (i.e., "re-printed") ticket is read (box 32) in the same manner that the original ticket was read at box 14. If the replacement ticket is okay, as determined at box 34, it is dispensed at box 52 to the customer. Otherwise, the process described for the original ticket at boxes 18, 20 and 22 is performed on the replacement ticket at boxes 36, 38 and 40. In the event the replacement ticket is found to be invalid at box 40, it is reversed at box 42 (e.g., back into the printer as described above in connection with box 24) and voided at box 44 as described above in connection with box 26. The voided ticket is then ejected as indicated at box 46 (as described in connection with box 28). An alarm is then provided to summon an attendant or inform a system operator that the terminal has malfunctioned, as indicated at box 48. An attendant is then dispatched to correct the problem (box 50). It is noted that at box 46, the replacement ticket, if invalid and voided, can alternatively be held without dispensing it to the recipient. As with the operation discussed in connection with box 28, instructions to hold or dispense the voided ticket can be received directly from the printer controller or from a remote processor.

FIGS. 2 through 6 illustrate an example thermal printer assembly that can be used to implement the invention. It should be appreciated that the illustrated printer is for purposes of example only, and that other printers and printer types can also be used to implement the present invention.

Figure 2:
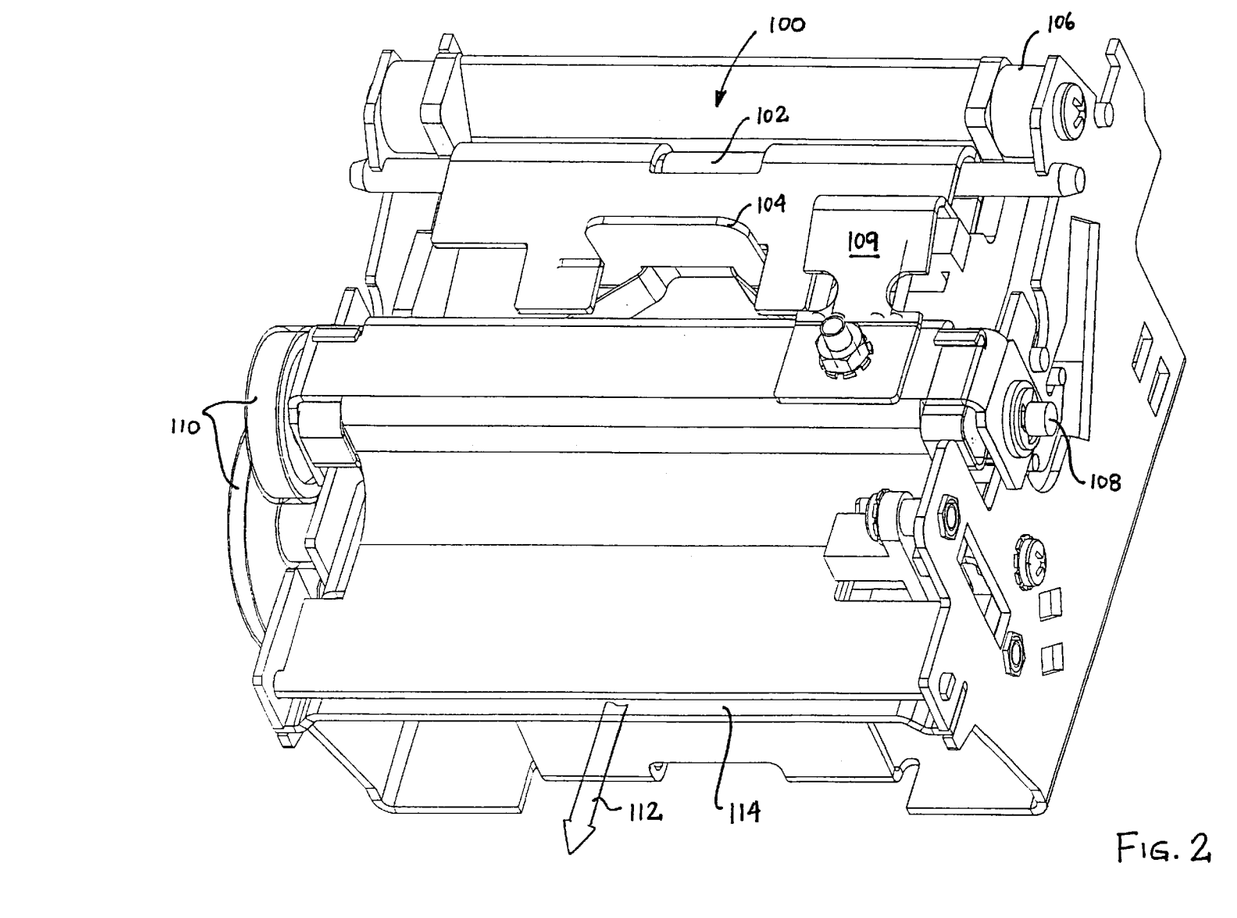
FIG. 2 is a top, front and right side perspective view of an example printer that can be used in accordance with the invention.
Figure 3:
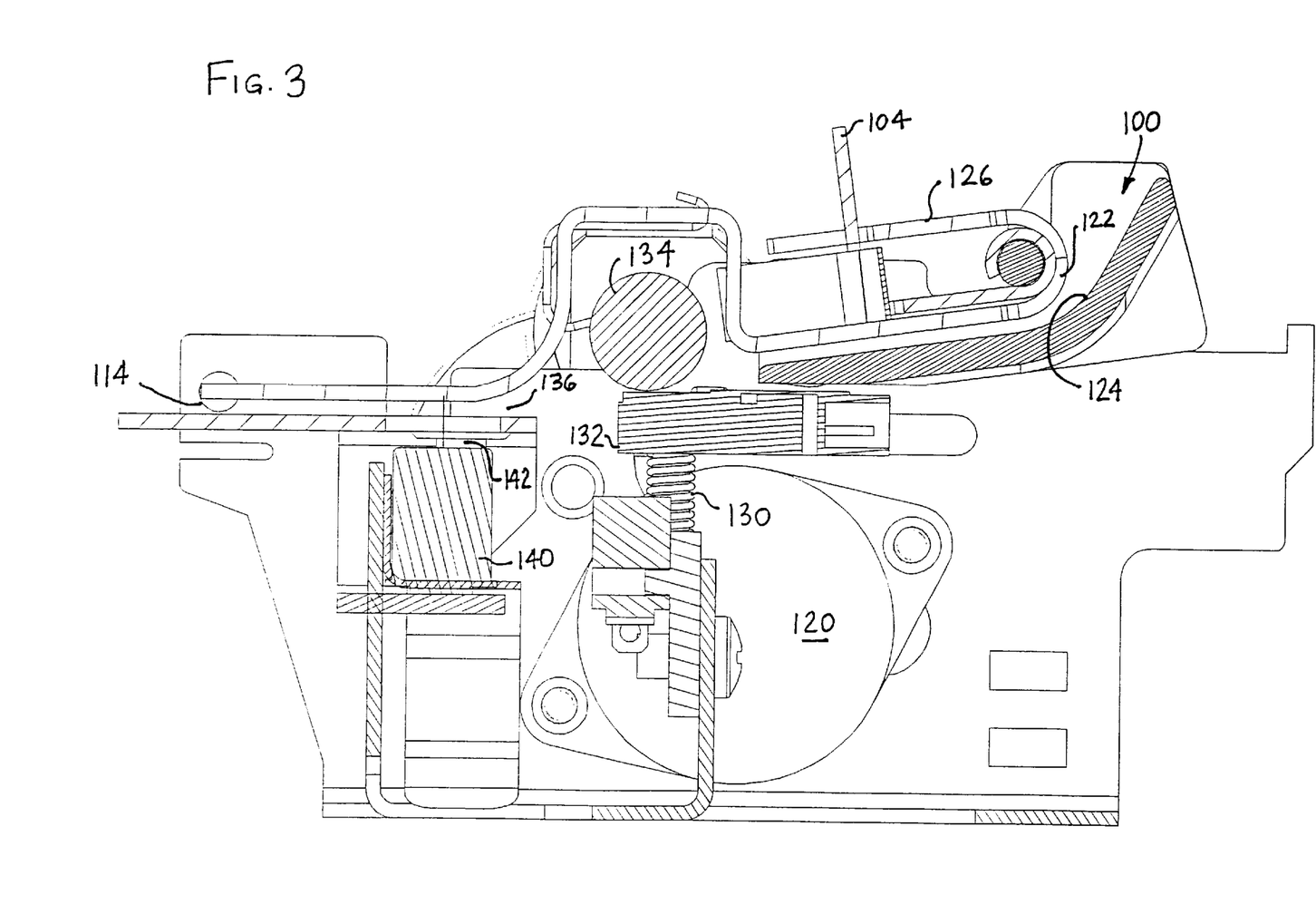
FIG. 3 is a cross-sectional view of the printer of FIG. 2, showing various paper feed, print and read components thereof.
Figure 4:
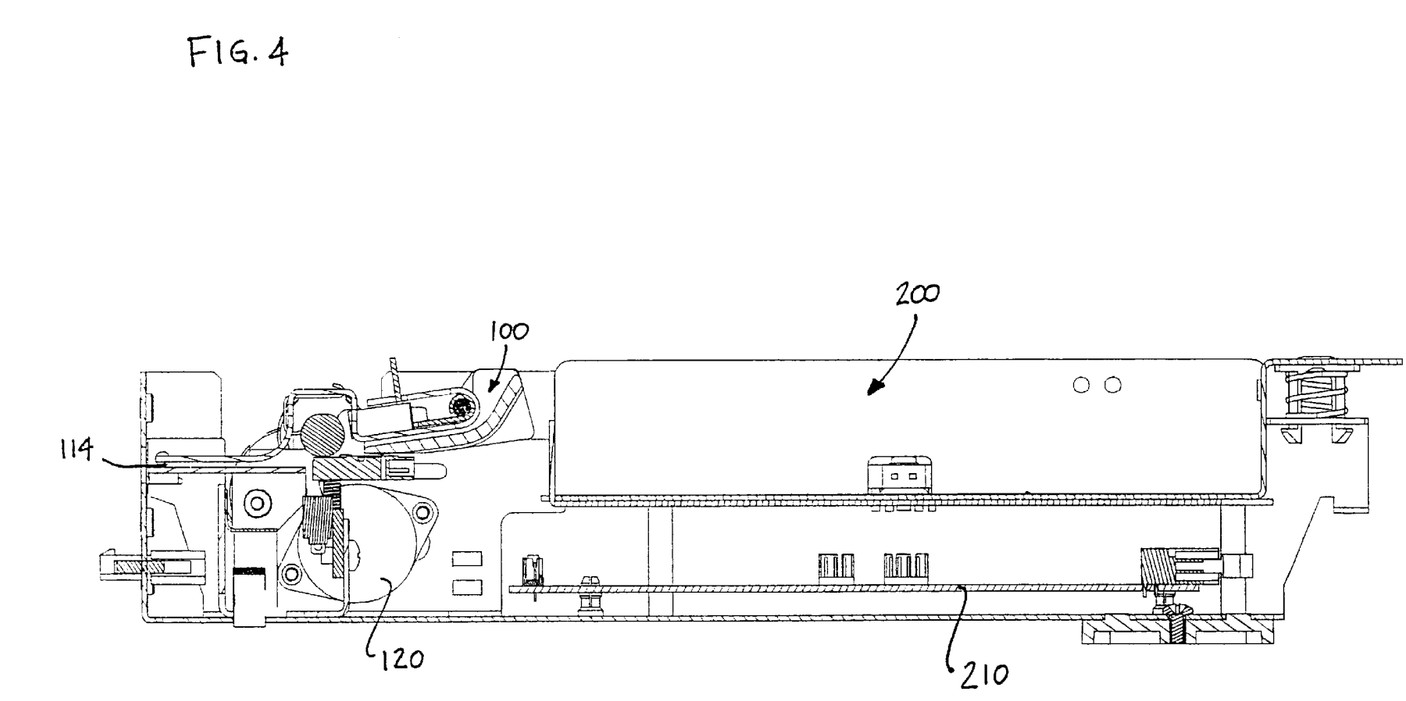
FIG. 4 is a cross-sectional view of the printer of FIG. 2, including an extending paper tray and control board assembly with associated structural components, taken along the line A—A of FIG. 5.

As best illustrated in FIGS. 2 to 4, a paper input chute 100 is provided for receiving paper, which may be in fanfold form, from a paper tray 200. The printer may also be configured to receive individual paper sheets (e.g., ticket stock) by using a sheet feed paper tray, usually provided at an angle above paper chute 100, in a conventional manner. A top of form sensor is provided under cover 109 (FIG. 2) to detect and register the paper substrate as it progresses past the chute 100 and further into the printer. The top of form sensor can read a pre-printed mark on the paper substrate, or can optically detect the leading edge of the paper as well known in the art. A latch 104 is provided to allow the printer to be opened to clear paper jams and for other maintenance needs.

Drive mechanism 106, which may be a gear or belt driven assembly, rotates a pressure roller assembly 102 for driving the paper introduced into chute 100 into the printer. As best seen in FIG. 3, paper driven by roller 102 is inserted between a paper entry portion 122 of an upper paper path guide assembly 126 and a corresponding lower paper path guide assembly 124. The paper is directed by the upper and lower guide assemblies to a platen 134, made of a resilient material such as rubber, silicone, or the like. Platen 134 provides a printing surface for a thermal print head 132, which is biased against the platen by a spring 130. The print head 132 prints indicia, such as text and a bar code or the like, on the paper substrate as it passes between the print head and platen. A stepper motor 120 is used together with various drive assemblies to transport the paper substrate through the printer by driving roller 102, as described above, as well as platen 134, which is rotatable along the axis of a shaft 108 via drive assembly 110. The drive assembly 110 is typically gear driven, but may also be belt driven, or may use a combination of belts and gears as well known in the art.

In accordance with the invention, stepper motor 120 is controllable to transport the paper, be it fanfold paper or single sheets such as ticket stock, bi-directionally. After the paper is printed, it is passed into an output chute 136 by rotating platen 134. The printing is then read by a read after print sensor 140 via opening 142. The sensor 140 is typically an optical sensor, but may alternatively be a magnetic sensor (in the event a magnetic code pattern is used) as well known in the art. Other well known sensor technologies may also be used. After reading the printed ticket for validation as described above in connection with FIG. 1, the stepper motor will either advance the paper (if validated) through an output slot 114 in the direction of arrow 112 (FIG. 2), or will reverse the paper so that it can be re-read by the sensor 140. If the printing (e.g., a printed bar code on the paper substrate) cannot be validated, the stepper motor 120 continues to advance the paper substrate back to the print head 132 so that the ticket can be voided. Then, the stepper motor reverses the transport direction again and ejects the voided ticket from the output slot 114. Alternatively, the voided ticket can be held by stopping the stepper motor at an appropriate point before the ticket is dispensed, or by diverting the voided ticket into a holding bin. At the same time (if a replacement ticket is to be printed), a new sheet of paper is advanced into the printer so that a replacement ticket can be printed, validated and if valid, dispensed through the output slot 114. In the event that the second (or subsequent, depending on the implementation) ticket is invalid, an error message is generated for triggering an alarm or the like to summon an attendant to the terminal for repair.

The printer is controlled by a control board 210 ("controller") shown in FIG. 4. This board contains the processing and logic components necessary to implement the flowchart of FIG. 1. In a preferred embodiment, the control board will contain memory such as programmable read only memory (PROM) for storing firmware that controls an on-board microcontroller. The control board can also contain hardware, logic, software and/or firmware to implement a notifying module. This module provides notification to a user of the terminal in which the printer is installed, to wait for a replacement ticket if a voided ticket is dispensed. Such notification can be provided on the voided ticket itself, on a display on the terminal, as an audio signal, or in any other manner. An alarm module can also be implemented on the control board, again through hardware, logic, software, firmware, or any combination thereof, in order to indicate that a voided replacement ticket has been dispensed and that the printer requires attention from a human attendant. A display driver and other typical controller circuitry can also be provided on the control board 210. In an alternate embodiment, all or part of the control functions and software/firmware therefor could be provided to the printer from a central server via a network, or from a remote processor provided in the device of which the printer is a component.

Figure 5:
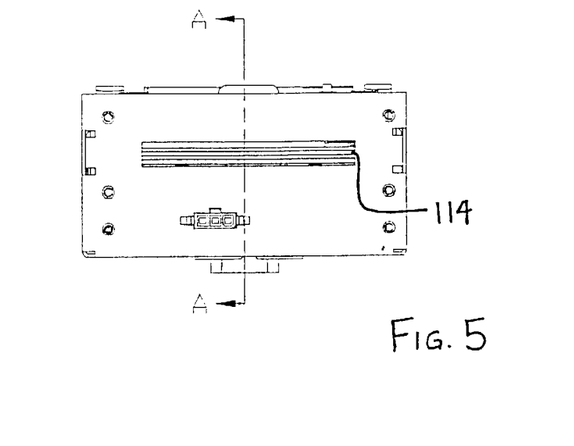
FIG. 5 is a front plan view of the printer of FIG. 2.
Figure 6:
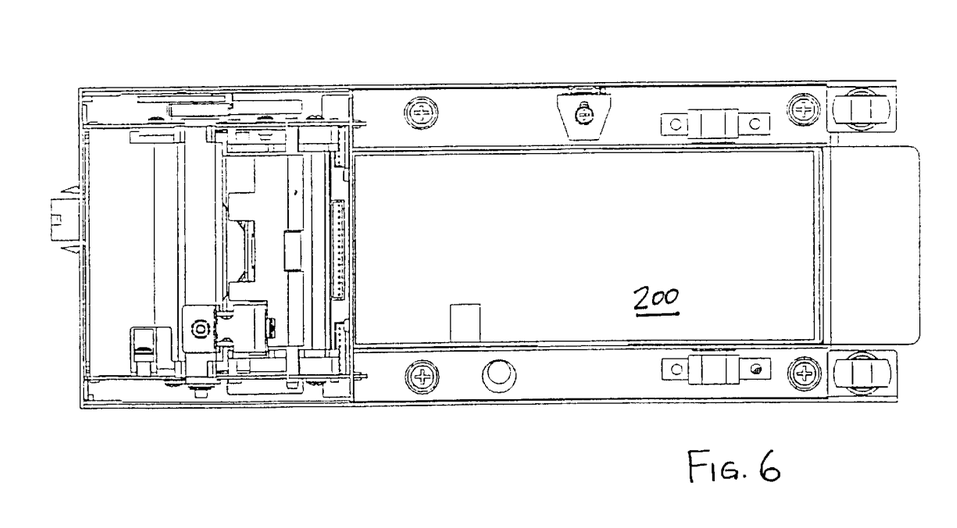
FIG. 6 is a top plan view of the printer and paper tray assembly of FIG. 4.

FIGS. 5 and 6 illustrate front and top plan views of the printer assembly and associated mounting structure. The printer is adapted to be mounted in a terminal, such as a self-service ticket machine, vending machine, or a gaming machine, in a conventional manner.

It should now be appreciated that the present invention provides methods and apparatus for printing, validating, and if necessary voiding and reprinting tickets, vouchers and the like. Original, voided and replacement tickets, when generated, may be dispensed to the user, reducing downtime of the system using the printer and reducing the need for human intervention from an attendant in the event of infrequent printing errors.

Although the invention has been described in connection with various specific embodiments, it should be appreciated that numerous adaptations and modifications may be made thereto without departing from the spirit and scope of the invention as set forth in the claims.

What is claimed is:

1. A method for printing and validating a document, comprising the steps of:
   printing said document;
   reading at least a portion of said document to test a validity criteria, and in response to said test:
      dispensing said document to a recipient if said validity criteria is met, and
      if said validity criteria is not met, repeating the reading step at least once to determine if said validity criteria is met;
      dispensing said document to the recipient as a valid document if the validity criteria is met after said repeated reading;
      voiding said document if said validity criteria is not met after said repeated reading; and
      proceeding by one of:
         (i) dispensing the voided document to said recipient,
         (ii) holding the voided document.

2. A method in accordance with claim 1, wherein the document is voided if the validity criteria is not met after a predetermined number of repeated reading steps.

3. A method in accordance with claim 1, wherein:
   the portion of said document which is read to test the validity criteria comprises a bi-directional code;
   an initial reading of the bi-directional code is performed in a first direction; and
   at least one reading of said bi-directional code during the repeating step is performed in a second direction opposite the first direction of the initial reading of the code.

4. A method in accordance with claim 1 wherein said voiding step voids said document by printing voiding indicia thereon.

5. A method in accordance with claim 1 wherein said document is a wagering ticket or voucher.

6. A method in accordance with claim 1, wherein the voided document is dispensed to said recipient.

7. A method in accordance with claim 1, wherein the voided document is held without dispensing it.

8. A printer with document verification, dispensing and voiding features, comprising:
   a transport;
   a print module for printing indicia on a substrate carried by said transport;
   a read module for reading at least a portion of said indicia to test a validity criteria;
   wherein said transport:
      dispenses said printed substrate to a recipient if said validity criteria is met; and
      returns said document to said read module for at least one re-reading of said indicia to re-test said validity criteria if said validity criteria is not met; such that the transport dispenses said printed substrate as a valid substrate if said re-test indicates that said validity criteria is met, and
      transports said printed substrate to be voided if said validity criteria is not met after said re-test.

9. A printer in accordance with claim 8, wherein said transport transports said printed substrate back to said print module, if necessary, to be voided.

10. A printer in accordance with claim 9, wherein said print module voids said substrate by printing voiding indicia thereon.

11. A printer in accordance with claim 9, wherein said transport is a bi-directional transport, and reverses direction to transport said substrate back to said print module.

12. A printer in accordance with claim 8, wherein said transport dispenses the voided substrate to said recipient.

13. A printer in accordance with claim 8, wherein said transport holds the voided substrate without dispensing it.

14. A printer in accordance with claim 8, wherein:
   the portion of said indicia which is read to test the validity criteria comprises a bi-directional code;
   an initial reading of the bi-directional code is performed by the read module in a first direction; and
   at least one re-reading is performed by the read module in a second direction opposite the first direction used for the initial reading of the indicia.

15. A printer in accordance with claim 8, wherein said print module comprises a thermal print head and said substrate comprises thermal print paper.

16. A printer in accordance with claim 8, wherein said printed substrate is a wagering ticket or voucher.

17. A printer in accordance with claim 8, wherein said read module comprises a bar code reader.

18. A printer in accordance with claim 8, further comprising a controller coupled to control said printing, reading and transport functions.

19. A printer in accordance with claim 18, wherein said controller causes said transport to dispense the voided substrate to said recipient.

20. A printer in accordance with claim 18, wherein said controller causes said transport to hold the voided substrate without dispensing it.

21. A printer in accordance with claim 18 wherein:

said controller communicates results of the validity criteria test to a remote processor; and the controller actuates at least one of the print module, read module and transport in response to subsequent instructions, based on said results, received from the remote processor.

22. A printer in accordance with claim 21, wherein said instructions instruct said controller to dispense the substrate to said recipient after voiding.

23. A printer in accordance with claim 21, wherein said instructions instruct said controller to hold the voided substrate without dispensing it.

* * * * *